UNITED STATES PATENT OFFICE.

JOHN F. MARTIN, OF CHICAGO, ILLINOIS, ASSIGNOR TO THE MARTIN ELECTRIC WIRE CONDUCTING COMPANY, OF SAME PLACE.

INSULATING COMPOUND FOR ELECTRICAL WIRES.

SPECIFICATION forming part of Letters Patent No. 274,622, dated March 27, 1883.

Application filed September 7, 1882. (No specimens.)

*To all whom it may concern:*

Be it known that I, JOHN F. MARTIN, a citizen of the United States, residing at Chicago, in the county of Cook and State of Illinois, have invented certain new and useful Improvements in Insulating Compounds for Electrical Wires; and I do declare the following to be a full, clear, and exact description of the invention, such as will enable others skilled in the art to which it appertains to make and use the same.

This invention relates to a new and useful insulating compound for electrical wires, which is non-combustible and non-heating; and it has for its object to prevent deflection of electricity from electric wires, and to guard against danger of fire therefrom.

My improved composition is prepared as follows: I take equal parts, by measure, of marble-dust and plaster-of-paris, and mix thoroughly while dry. I then add a weak solution of glue-water, commonly called "sizing," until the mixture is reduced to a consistency that will pour freely from a vessel.

The compound thus prepared may be used in a variety of ways for the purpose above designated. For instance, I may mold it into tubes or plates of any desired length and of a size proportionate to the number of wires desired to be run through said tubes or plates. I take a mold and place at each end a bearing, in which are supported the ends of as many brass rods as there are wires to be used. These rods I use as cores, and they should be oiled before using. The rods are so adjusted in their bearings as to preserve the proper distance between them—say one inch. I then pour the mixture into the molds and around the rods. While the mixture is hardening the rods should be gently turned two or more times to prevent the mixture adhering to them. In about twenty minutes the rods may be withdrawn and the tubes or plates placed in racks or on shelves to dry. After three or four days they will be found sufficiently hard and tough for all practical purposes, but will improve with age.

Another and preferable way of making the insulating-tubes is shown in my application for Letters Patent filed June 2, 1882, Serial No. 63,092, in which the tubes or plates made of this compound are covered with a suitable fabric, and especially designed as conductors for electric light and other electric wires which are carried into buildings, said tubes being adapted to be concealed in or form a part of the finishing work or other part of said buildings.

This compound, being a non-conductor, prevents the deflection of the electricity by reason of its non-combustible and non-heating qualities.

The "glue-size," although not indispensable, as pure water may be used with effect, adds to the strength, cohesiveness, and firmness of the compound.

The proportions may be varied as occasion may require; but I have found that the above-stated parts answer well for general purposes.

In making my experiments I have varied the proportions of the marble-dust and plaster-of-paris all the way from one-fifth marble-dust to four-fifths plaster-of-paris up to three-fourths marble-dust to one-fourth plaster-of-paris.

Instead of the plaster-of-paris, I may use English Portland or hydraulic cement without changing the spirit of my invention, but find the plaster-of-paris preferable, and the proportions of one-half each of it and marble-dust to produce the most satisfactory results.

This insulating compound possesses may advantages over glass or other hard substances that are used for electrical insulation, among which is its resistance to the action of heat without weakening or breaking, its non-heating and non-combustible qualities, and uniting in itself the essential qualities of being a perfect electrical insulator and a fire-proof and non-combustible material, capable of being cut, sawed, and worked with almost equal facility with wood.

Having thus described my invention, what I claim, and desire to secure by Letters Patent, is—

1. An insulating compound for electrical conduits and other purposes, consisting of marble-dust, plaster-of-paris, and glue-size, substantially as set forth.

2. A tube or analogous structure composed of an insulating compound consisting of marble-dust, plaster-of-paris, and glue-size, substantially as described, for the purpose of making a non-combustible and fire-proof conduit.

In testimony whereof I affix my signature in presence of two witnesses.

JOHN F. MARTIN.

Witnesses:
ISRAEL COWEN,
PERCY V. CASTLE.